United States Patent
Baucum, Jr. et al.

(10) Patent No.: US 7,626,283 B1
(45) Date of Patent: *Dec. 1, 2009

(54) ALTERNATIVE ALTERNATING CURRENT POWER SUPPLY AND METHOD OF ITS USE

(76) Inventors: William E. Baucum, Jr., 1402 Harton Blvd., Tullahoma, TN (US) 37388; William E. Baucum, III, 597 York Rd., Crossville, TN (US) 38555

( * ) Notice: Subject to any disclaimer, the term of this patent is extended or adjusted under 35 U.S.C. 154(b) by 266 days.

This patent is subject to a terminal disclaimer.

(21) Appl. No.: 11/741,846

(22) Filed: Apr. 30, 2007

Related U.S. Application Data

(63) Continuation-in-part of application No. 10/634,256, filed on Aug. 5, 2003, now Pat. No. 7,227,282.

(51) Int. Cl.
*H02J 9/00* (2006.01)
*H02J 3/00* (2006.01)
*H02H 3/00* (2006.01)

(52) U.S. Cl. ............... 307/23; 307/18; 307/25; 307/29; 307/65; 307/80; 361/67; 361/84

(58) Field of Classification Search .......... 307/18, 307/23, 25, 29, 65, 80; 361/67, 84
See application file for complete search history.

(56) References Cited

U.S. PATENT DOCUMENTS

| | | | | |
|---|---|---|---|---|
| 4,376,250 A | * | 3/1983 | Baker et al. | 307/150 |
| 4,675,538 A | * | 6/1987 | Epstein | 307/64 |
| 5,118,301 A | * | 6/1992 | Bentivolio | 439/188 |
| 5,233,230 A | * | 8/1993 | Bonar | 307/64 |
| 5,895,981 A | * | 4/1999 | Flegel | 307/64 |
| 5,949,640 A | * | 9/1999 | Cameron et al. | 361/600 |
| 6,328,597 B1 | * | 12/2001 | Epps | 439/502 |
| 6,455,954 B1 | * | 9/2002 | Dailey | 307/66 |

* cited by examiner

*Primary Examiner*—Albert W Paladini
*Assistant Examiner*—Hal I Kaplan
(74) *Attorney, Agent, or Firm*—Stephen J. Stark; Miller & Martin PLLC

(57) ABSTRACT

An alternative power source provides alternating current (AC) through a proper connector into a first outlet of a pre-existing electrical distribution system which is normally powered by an alternating current electrical power supply through main breakers and a breaker box. At least one of the breakers which controls power from the normal AC electrical power supply on the electrical distribution system is opened prior to connecting the alternative power supply. The alternative power supply provides electricity through the proper connector into the first outlet, or node, to provide alternating current to a selected portion of the electrical distribution system, and possibly to both halves of the pre-existing electrical distribution system if the proper connector is connected to a 240 volt outlet, or if two proper connectors are utilized and connected to first and second outlets with the first and second outlets on each of the two phase (power) wires of the pre-existing electrical distribution system.

19 Claims, 5 Drawing Sheets

Electrical Distribution System

Figure 6 : Electrical Distribution System

ALTERNATIVE ALTERNATING CURRENT POWER SUPPLY AND METHOD OF ITS USE

CLAIM OF PRIORITY

This application is a continuation-in-part of U.S. patent application Ser. No. 10/634,256 filed Aug. 5, 2003 now U.S. Pat. No. 7,227,282.

BACKGROUND OF THE INVENTION

The present invention relates to alternating current (AC) electrical power supply and method of its use, and more particularly to a method and apparatus for providing alternating current to an existing electrical distribution system involving the disconnection of the normal source of power to the distribution system, i.e., the electric utility company, and the supply of the alternate source of AC power into an outlet receptacle of the distribution system to power other nodes of the distribution system.

FIELD OF THE INVENTION

Description of Related Art

U.S. Pat. No. 5,949,640 describes the state of the art of typical alternating current inverters. As described by this reference, inverters are generally designed for two installation options. The first installation option is for the inverter to be permanently wired to an AC electrical wiring system in the house, vehicle or building. U.S. Pat. No. 6,455,954 shows a hard wired alternative power source connected to the breaker panel. A sensor switch is utilized along with a programmable controller to select the power source provided to the breaker panel.

The second installation option is a stand alone option. In this approach, standard male plugs from electrical devices are plugged into AC outlet receptacles connected directly to the inverter. Typically, generators and battery powered units have receptacle outlets thereon so that electrically operated devices may be plugged directly into the housing that contains the inverter. A commercial embodiment of this design is sold by Xantrex Company which makes a product under the trademark xPower 1500™ of this typical design. U.S. Pat. No. 4,376,250 shows a portable power source for providing power through outlets 102.

A simple modification of this design is an uninterruptible power supply and voltage conditioner. U.S. Pat. No. 4,675,538 shows a traditional uninterruptible power supply where a constant voltage is maintained at outlet terminal 64. These type devices are well known in the art.

U.S. Pat. No. 5,233,230 shows a specialty power cord capable of providing either utility company AC power or DC power from an internal battery to small appliances. In this design, the plug 12 is utilized to plug into standard wall outlets while the receptacle 14 is utilized to receive the plug from the small appliance. When utility power is out, this device can power resistive loads such as certain electric heaters. It will not work for inductive loads such as electric motors, etc.

While uninterruptible power supplies, portable generators and hard wired backup power systems are known in the art, there is not believed to be a portable and temporary method of applying power to at least a portion of an existing electrical distribution system which could be easily and quickly operated by the public without a need for electrical expertise.

SUMMARY OF THE INVENTION

Accordingly, it is an object of the invention to provide a convenient temporary power source for providing power to a pre-installed electrical distribution system such as in a residence or other structure or vehicle normally powered by electrical service provided from an electric company. Also, an appliance may be plugged directly into a receptacle on this power source to receive electric power.

Another object of the present invention is to provide a portable power source for providing temporary power to at least a portion of a permanent distribution system normally powered by a utility company.

Yet another object of the present invention is to provide a special connector for providing power from another source of AC power to at least a portion of an electrical distribution system normally powered from an electrical AC source, such as an electric company.

Accordingly, a portable power generation system is comprised of batteries which provide a direct current voltage supply to a DC to AC converter which is then utilized to provide AC power through a special AC conductor into an outlet receptacle of a portion of a power distribution system normally powered by an electric company. Prior to connecting the special conductor to the outlet receptacle, at least one breaker disconnecting the at least a portion of the distribution system is opened so that the portion of the electrical distribution system may be supplied through the use of another power supply. In the preferred embodiment, it is preferred that the main breaker(s) is/are the breaker opened so that the power supply from the electrical company is disconnected from the electrical distribution system.

Under normal conditions this would result in no power being supplied to any loads of the electrical distribution system, but since power is being provided from the presently preferred source of power into the receptacle, electrical power can be provided through one or more breakers and/or nodes to various electrical loads connected throughout the electrical distribution system.

The electrical conductor connecting the power source to the outlet receptacle of the power distribution system could be as simple as an electrical cord having two male plugs in some embodiments. In other embodiments, modifications may be made to avoid ground loops. The applicants are unaware of the existence of any such power connector that would operate properly with existing technology. All known devices requiring electrical power have a male plug to plug into an outlet receptacle. All known power sources provide a female outlet receptacle to receive this plug.

BRIEF DESCRIPTION OF THE DRAWINGS

The particular features and advantages of the invention as well as other objects will become apparent from the following description taken in connection with the accompanying drawings in which.

DETAILED DESCRIPTION OF THE INVENTION

Figure 1:
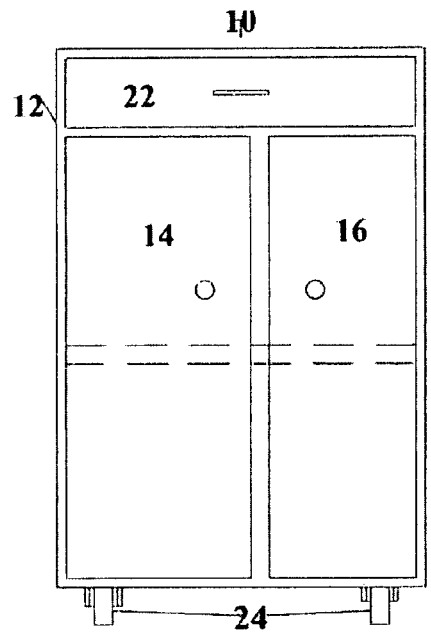
FIG. 1 is a front plan view of a portable power supply unit according to presently preferred embodiment of the present invention.
Figure 2:
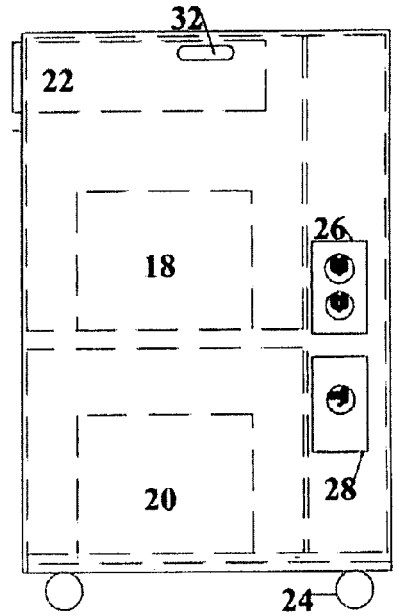
FIG. 2 is a side view of the portable power unit shown in FIG. 1.

FIG. 1 shows an alternative power supply 10 held in cabinet 12. A pair of doors 14,16 allow internal access within the cabinet 12 to access batteries 18,20 shown in phantom in FIG. 2. Of course, in other designs, the batteries 18,20 could be replaced with a generator or other suitable power storage and/or power producing device.

From FIG. 1, the cabinet 12 is preferably equipped with a drawer 22 to allow for storage. The cabinet 12 is moveable as it is preferably located on rollers shown as casters 24. In the presently preferred embodiment, the alternative power supply 10 is equipped with a set of 120 volt outlet receptacles 26 so that electrical loads can be directly plugged into the alternative power supply 10.

In an alternative embodiment a high voltage (typically about 240 volt) receptacle 28 may also be utilized. Furthermore, either of the outlets 26,28 may be utilized in conjunction with the connector 30 shown in FIG. 5 which will be described in further detail below. The cabinet 12 is preferably equipped with side pulls 32 to assist in maneuvering the cabinet 12 to a desired location, if necessary.

Figure 3:
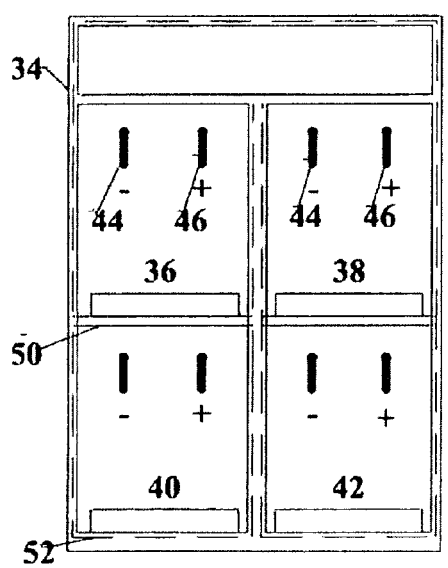
FIG. 3 is a front view of an inside panel of the portable power unit shown in FIG. 1.

FIG. 3 shows the front side of an interior panel 34. The interior panel 34 has battery locations 36,38,40,42 wherein positive leads 44 and negative leads 46 can connect with positive and negative terminals of batteries 18,20 shown in phantom in FIG. 2 when installed. Battery straps 48 are useful in securing the batteries 18,20 to the supports 50,52. The supports 50,52 may also be constructed in the form of a tray to catch battery acid overflow.

Figure 4:
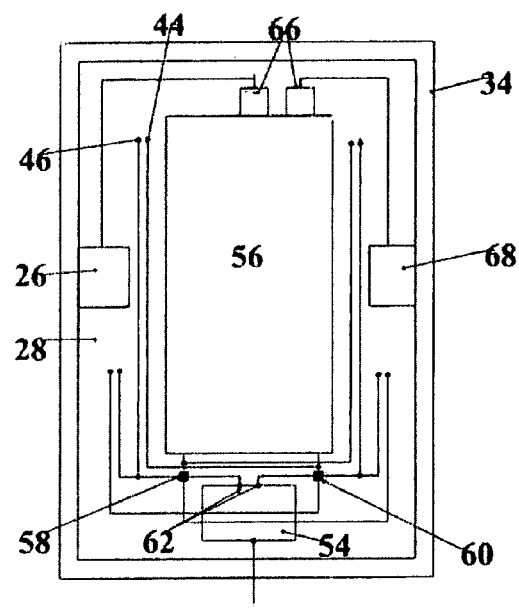
FIG. 4 is a back view of the inside panel shown in FIG. 3.

FIG. 4 shows a back view of the internal panel 34. The positive and negative leads 44,46 are shown passing through the panel 34. The leads 44,46 are then directed to a junction connector 58,60, or main terminals, along with the charger 54 and an inverter 56. These wires are preferably sized to produce a negligible voltage drop between the batteries 18,20, and the inverter 56 input during maximum power output.

Connection 62 may be utilized together with a cord and a plug to provide electricity to the charger 54 to charge the batteries 18,20 in one embodiment. The negative leads 46 connect to the negative terminal 58 and to the charger 54. If only 120 volt input AC power is utilized, the negative lead from the connection 62 is connected to the negative terminal 58 as shown. If 120 volt input AC power is utilized, the phase and neutral wires are connected to the charger's AC input. The AC ground wire is connected to the inverter case. The positive output terminal may be connected to 60 as shown. For 240 volt input power, this connection will be slightly different but obvious to one skilled in the art.

When charging the batteries 18,20 through the cord connected at connection 62, the charger 54 converts AC voltage and current into DC voltage and current to keep the batteries 18,20 properly charged when utility company power is available. It is anticipated that charger 54 will include a processor to determine when the batteries 18,20 have been adequately charged to then prevent further drawing of power from the source of electricity at connection 62. The inverter 56 is utilized to provide power through outlets 26,28 or otherwise, especially through the connector 30 shown in FIG. 5. Plugs 64,66 are connected to the inverter so that alternating current may be provided through outlets 26,28,30 shown in FIG. 4. Outlet 28 is configured to provide approximately 240 volts while outlets 26,68 are configured to provide approximately 120 volts as shown in FIG. 4.

Figure 5:
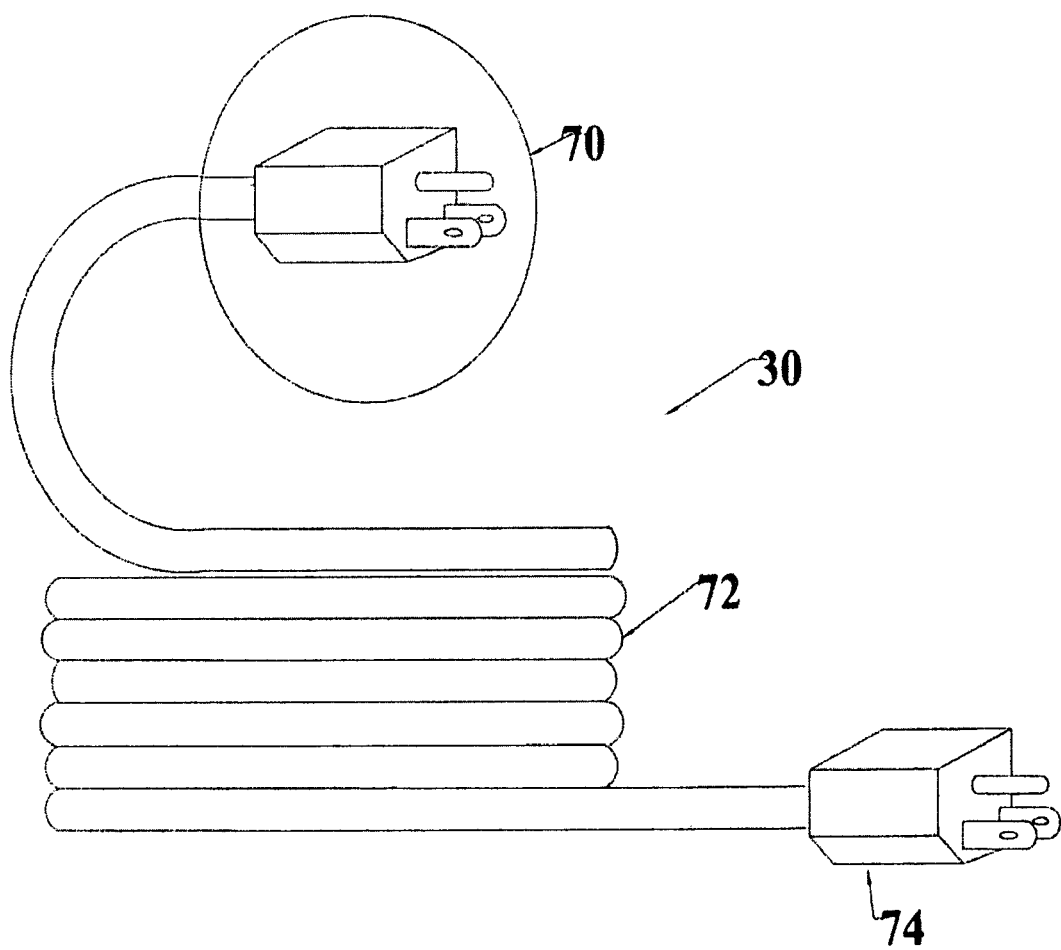
FIG. 5 is a presently preferred embodiment of a connector conduit with 120 volt male plugs for use with the power supply shown in FIGS. 1 through 4.

Connector 30 shown in FIG. 5 is very useful in implementing the preferred method of the present invention. While alternative power supply 10 is believed to have some unique functions, its primary objective is to provide electrical power at the outlets 26,28,68. The connector 30 is comprised of a male plug 70 connected to a cord 72 at a first end which connects to a second male plug 74 at an opposing end of the cord 72. Although 120 volt male plug 70,74 illustrated, is alternatively possible that male 240 volt plugs of various configurations known in the art could also be utilized, however, that embodiment will be explained in further detail below.

Figure 6:
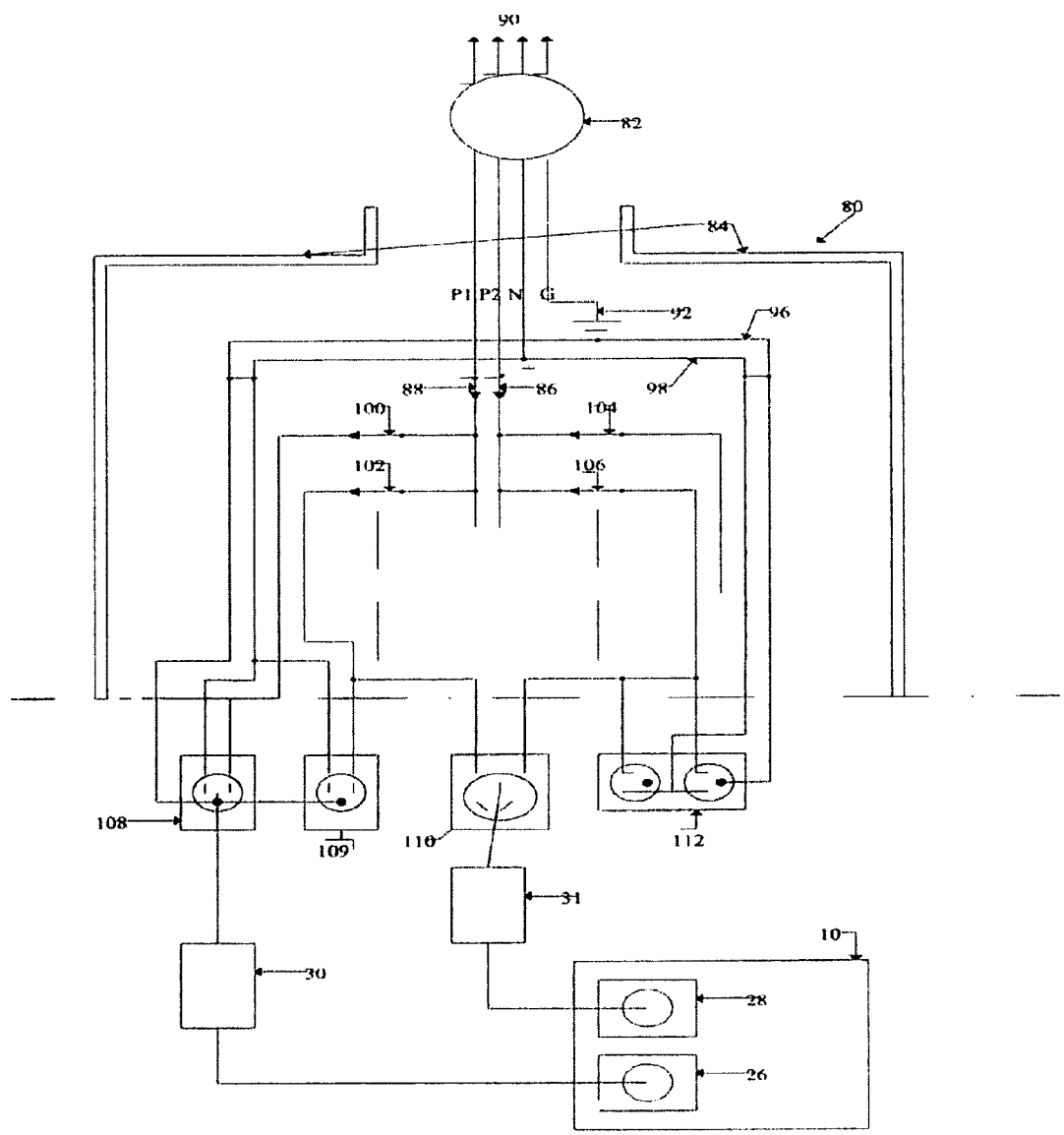
FIG. 6 is a schematic diagram representing an electrical distribution system connected to an electrical meter with electric power normally supplied from a utility company while showing how the portable power supply of FIGS. 1-4 can be made to power portions of the electrical distribution system such as with the conduit of FIG. 5 in accordance with a presently preferred method of utilizing the portable power unit.

The first male plug 70 can be plugged in the first or second 120 volt outlets 26 of the alternative power supply 10 as shown in FIG. 6. The cord 72 then provides electricity to the second male plug 74. As shown in FIG. 6, this male plug 74 may be connected to a 120 volt outlet of an electrical power distribution such as an outlet in a house, building, or mobile home. By providing power directly into what is normally used as an outlet, that half of the 120 volt system is now powered by the alternating power supply 10. It is important to disconnect the normal source of electrical power prior to plugging in the alternative power source. Further details describing this method will be described below.

FIG. 6 shows a typical house electrical distribution system 80 with an alternator power supply 10 and method of its use. The electrical distribution system 80 normally receives power from a utility company through a meter 82 which is then normally supplied into an electrical distribution box 84 which contains main breakers 86,88 coming from the meter 82. The main breakers 86,88 are normally shut so that power can flow from the utility company, or other normal source 90 to the meter 82 and into the electrical distribution box 84. Since the utility company or other normal source 90 provides 240 volts into the house, building or vehicle through main breakers 86,88. Each of the two halves of the box 84 carry 120 volts with respect to ground 92.

Inside the box 84 is located ground 96, neutral 98, and breakers 100,102,104 and 106. Of course, more breakers are likely to be present in most distribution boxes 84. However, for the purpose of illustration, four breakers 100,102,104,106 can adequately show the desired features of the claims. Additionally, although breakers 100 and 104 are illustrated separate and spaced apart, it is also common in the art that the breakers be molded together to then supply a 240 volt outlet with 240 volts.

Electrical power from the breakers 100,102,104,106 then proceeds to outlets or hard wired loads such as stoves, dishwashers, lights, etc. For purposes of illustration, outlets 108, 109,110, 111 and 112 are shown for illustration purposes. Obviously, most buildings and/or vehicles utilizing electrical distribution system will have significantly more than three outlets 108,109,112 loads such as lights, dishwashers, etc., that are hard wired and/or electrical load type breakers 100, 102,104,106.

As shown in FIG. 6, outlets 108,109,112 are 120 volt outlets due to their configuration within the system 80, and outlet 110 is a 240 volt outlet. In Europe and other countries, the voltage could differ, similar principles are believed to likely apply.

The connector 30 is connected to an outlet 26 on the alternative power supply 10 while simultaneously plugged into the outlet 108 or node of the electrical distribution system 80 after the at least one breaker such as main breaker 86 is open. Alternatively, it is possible that breaker 102 could be open since the outlet 109 would receive power through a portion of the electrical distribution system whether or not the breaker 102 is open or not. If 102 is allowed to remain closed and breaker 86 is opened, then outlet 111 would be powered through breaker 100 as long as breaker 100 remains closed. By opening breaker 86 and maintaining breakers 100 and 102 closed, the load powered from the left half of the distribution box 84 could be powered by the alternative power supply 10. Of course, no 240 volt loads could be powered since the 240 volt outlet 110 is only receiving 120 volts.

If an alternative embodiment of the connector 31 as shown in FIG. 6 is utilized which is adapted to communicate a 240 volt outlet 28 with 240 volt outlet 110 of the electrical distribution system 80, then loads connected to both the right and left of the box 84 half may be supplied as long as both main breakers 86,88 are open and breakers 100,102,104,106 remain closed. Outlets 108,109,110 and 112 would all be powered, along with any other selected load by the alternative power supply 10. Of course, some of breakers 102,106 could be opened to remove undesired loads. Each of the two mains would be powered, but imbalanced loads could cause problems unless a regulated source of power is provided. A somewhat sophisticated generator transformer inverter may be helpful in utilizing this embodiment depending on the loads to be operated.

While an alternative power supply 10 is shown as battery operated, it should also be readily apparent that generators or other electrical power sources or storage devices could be utilized with the connector 30 to supply portions of the electrical distribution system 80.

While it is anticipated that four batteries will be utilized in the alternative power supply 10, other numbers of batteries 18,20 may be utilized. For a 1500 watt inverter 56, the battery supply is ideally capable of producing about 125 amps of electrical current. Since one embodiment of a battery can typically supply 25 amps for two hundred twenty minutes, it appears that four batteries connected parallel would be necessary so that the current required from any one particular battery would be around 30 amps. It has been found that loading a battery past that point significantly reduces the supplied amp hours from the battery.

The leads 44,46 connecting the batteries 18,20 to the inverter 56 were determined to be have a preferred wire size of number 6AWG so they can handle 33 amps DC load. The wires connecting the main terminals 58,60 to the input of the inverter 56 and of the charger 54 are preferred to be number 4AWG and of similar lengths. At the output of the inverter 56, cables which use 12-2 round cable with standard 120 volt plugs 64,66 are preferred. Standard 120 volt 20 amp receptacles were utilized as outlets 26,68. The charger 54 of the preferred embodiment is a 1.5-amp trickle charge battery charger so that noxious fumes were not formed during charging. With the preferred configuration a 1500 watt continuous and 3000 watt momentary capacity inverter 56, the alternative power supply 10 is a relatively powerful electrical force.

An electrical utility outage of approximately two or three days could be sustained using charged batteries having a reserve capacity (RC) of at least 220 minutes. Of course, high powered appliances such as microwaves, refrigerators, and freezers, would only be utilized when needed and only for short periods. Other low power appliances such as TV, lights, computers, radios, etc., could be left on as needed during a power outage. If power outages are suspected as always being short, such as 15 minutes to one hour, a single battery 18 could power the alternative power supply 10 properly.

In conducting tests with the prototype unit, a Cobra electronics HGPI 2000 inverter 56 works satisfactorily. Other cheap inverters were found to burn out at medium powers and low powers. They also were prone to failing to protect users from electric shock.

During testing, it was found that it was more convenient to connect the power supply 10 to the building electrical system 80 so that it could power some or all of the pre-existing system 80, and thus, some or all of the appliances and loads already connected to it at the central breaker box 84. An analysis of this possibility showed that for voltages of approximately 120 volts, the connector cord 30 could be used if the cord's ground wire was cut to prevent ground loops from occurring which would otherwise cause noise and/or rob energy from the system 80 and/or supply 10. If the ground wire is not cut, there can be two points, separated by a relatively long length of wire, between which the electrical circuit will be grounded (see FIG. 6). This could result in ground loops.

Cutting the ground wire, or alternatively, not providing such a wire with the cord 30 on the connector cord 30, is useful to avoid the possibility of problematic ground loops. The step of cutting an existing ground wire for this purpose is believed to be new.

Powering both halves of the box 80 is contemplated with a 240 volt connector with 240 volt male plugs on either end, it is alternatively possible to use two 120 volt connectors as illustrated in FIG. 5 so long as outlets are utilized on opposite halves of distribution box 84 such as one of 108,109, 111 with one connector 30 and another connector 30 connected to outlet 112 as shown in phantom in FIG. 6. This would then power everything in box 84 including 240 volt outlet 112. Load imbalance problems have been discussed above as they relate to the use of alternative embodiment connectors. Since powering two "phase" nodes 86,88 may draw differing amounts of power from the alternative power source 10, the source 10 must be able to operate in this manner. A regulator may need to be connected in the mode of operation. Furthermore, there is not believed to be a need to cut ground wires to avoid ground loops in this configuration.

Of course the cord 30 could contain a 120 volt plug on the end which connects to the supply 10 and a 240 volt plug on the end which connects to the electrical distribution system 80. Since only 120 volts would be supplied, although perhaps only portions of 240 volt appliances would operate, the 120 volt electrical distribution system 80 would still be supplied with 120 volts since the 120 volts would be supplied to both halves of the 240 volt plug, only not out of phase as they are normally provided.

Figure 7:
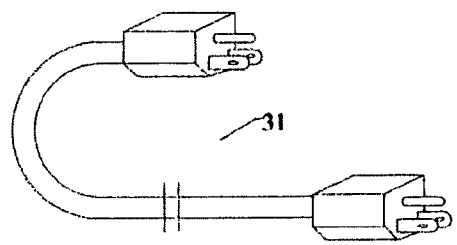
FIG. 7 is a detailed perspective view of the cord illustrated in FIG. 6.

FIG. 6 also shows another cord 31 in phantom which has a 240 volt plug on each end. FIG. 7 shows a detailed view of this cord embodiment. There are a variety of 240 volt plug configurations which are known in the art such as those utilized with stoves, dryers, air conditioners, etc. The illustrated embodiment is just one variation.

Figure 8:
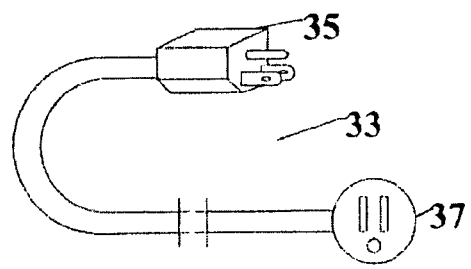
FIG. 8 shows a perspective view of an adapter of an alternatively preferred embodiment.
Figure 9:
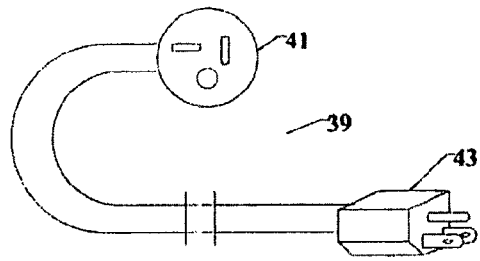
FIG. 9 shows a perspective view of a cord of an alternatively preferred embodiment.

FIG. 8 shows an adapter 33 that may be utilized with the embodiment of FIG. 5 to create the embodiment shown in FIG. 9. The adapter 33 includes a male 240 volt plug 35 and a female 120 volt plug 37. Of course, other 240 volt plug configurations are known in the art. With one of the two male plugs shown in FIG. 5 plugged into female plug 37, the functional equivalent of cord 39 of FIG. 9 is created which has a 240 volt plug 41 and a 120 volt plug 43 and may be utilized as described above for such a configuration. Of course other 240 volt plug configurations may be substituted for the illustrated configuration.

Figure 10:
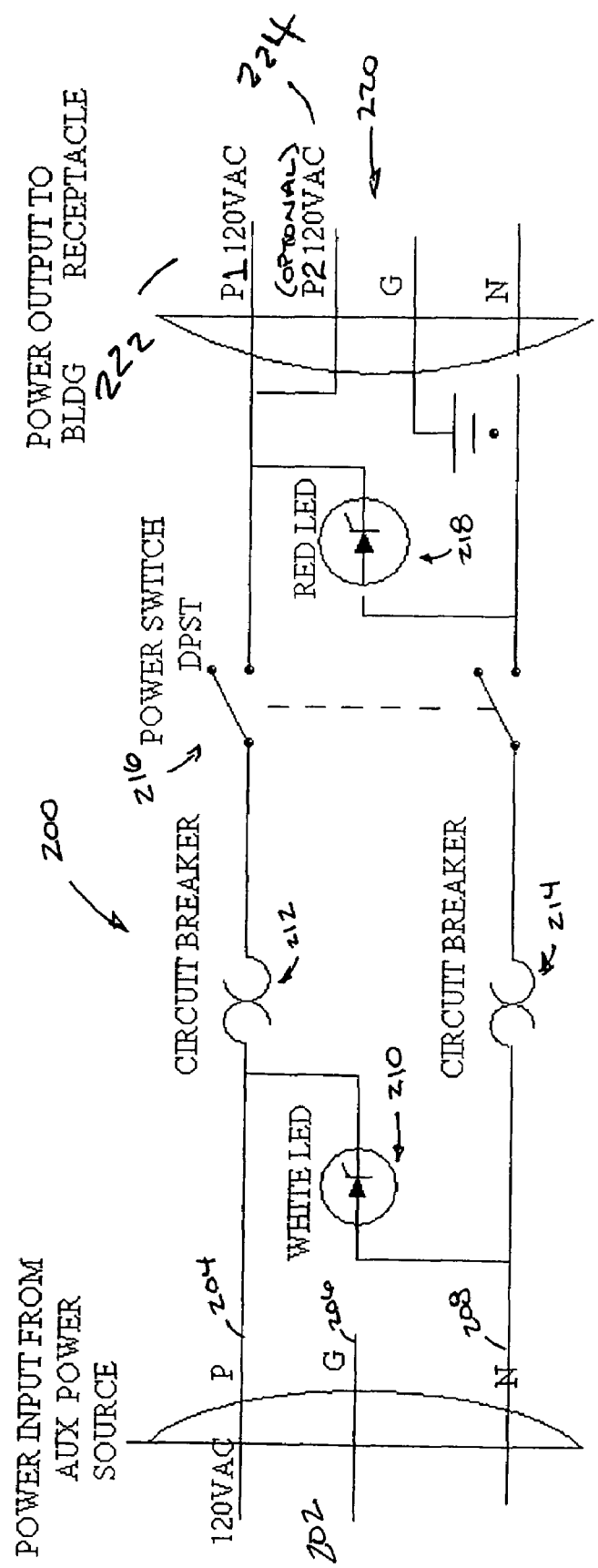
FIG. 10 shows a detailed schematic view of a transfer switch such as the switches could be utilized with, as part of, or in place of connector(s) 30,31 shown in FIG. 6.

FIG. 10 shows a diagrammic representation of a transfer switch 200 which receives power input such as where one or both of connectors 30,31 connects to the auxiliary power source, shown as alternative power supply 10 at power input 202. Phase line 204, ground 206 and neutral line 208 are shown. A first indicator 210 is shown as a white LED indicating electrical power at the input 202. Circuit breakers 212,214 are useful such as to break electrical connection when current exceeds a predetermined amount such as 20 amps.

A Double Pole Single Throw (DPST) switch 216 is illustrated. It could be rated at 20 amps continuous, 40 amps surge, or provide other settings. Other switches, such as one having a controller connected thereto could be utilized in other embodiments. Second indicator 218 is illustrated which indicates whether there is any electrical power at the building power side 220.

Building power side 220 is shown having first phase line P1 222 and optional second phase line P2 224 which could be utilize for providing 240 volts to those loads. It will be understood by those of ordinary skill in the art that P1 222 and P2 224 (if used) carry the same phase in the illustrated embodiment. P2 is useful in a 240 volt scenario to transfer power from a 120 volt receptacle to a 240 volt receptacle to power both of the phase nodes 86,88 in box 80. Other embodiments may not have optional second phase line 224.

The transfer switch 200 has been found useful to ensure that alternative power source 10 and building power supply are not both attempting to provide power to electrical loads.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A back up electrical power system with a temporary power connection, a back-up power supply, and an electrical distribution system, comprising:
a cord having at least two separated insulated conductors therein having a first end and an opposing second end; and
an integral electrical distribution system of one of a vehicle and a building having a plurality of nodes and normally powered by an alternating power source out of the plurality of nodes at outlets, said electrical distribution system having at least one main breaker in an open configuration thereby electrically isolating at least a first outlet from the alternating power source;
wherein the first end of the cord is plugged into the first outlet of the plurality of outlets of the electrical distribution system downstream of the opened at least one main breaker and the second end of the cord is in electrical communication with a second outlet of a backup power source, said backup power source thereby providing alternating current to a selected portion of the electrical distribution system downstream of the at least one main breaker through the first and second outlets; whereby the backup power source provides the alternating current into the first outlet in an opposite direction of current flow than the first outlet has with the alternating power source normally powering the electrical distribution system when an appliance is connected to the first outlet.

2. The back up electrical power system of claim 1 wherein the first and second ends of the cord are configured to be accepted within 120 volt, 20 amp outlet receptacles.

3. The back up electrical power system of claim 1 in combination with the backup power supply, said backup power supply comprising at least one source of 120 volt alternating current provided through the first outlet, and said first end of a connector is connected to the first outlet in an operating configuration.

4. The back up electrical power system of claim 3 wherein the backup power supply is powered by an inverter supplied by a direct current battery.

5. The back up electrical power system of claim 4 wherein the at least two separated conductors of the cord further comprises a ground wire, and said ground wire does not communicate a ground from the first outlet to the second outlet thereby preventing ground loop interference passing through the cord.

6. The back up electrical power system of claim 3 wherein the backup power supply further comprises a charger connected to the batteries.

7. The back up electrical power system of claim 1 further comprising a 240 volt backup power source.

8. The back up electrical power system of claim 1 further comprising a switch intermediate the first and second outlets.

9. The back up electrical power system of claim 8 wherein the switch further comprises at least one breaker.

10. The back up electrical power system of claim 8 further comprising at least one voltage indicator.

11. A back up electrical power system with a temporary power connection, a back-up power supply, and an electrical distribution system, comprising:
an integral electrical distribution system of one of a vehicle and a building having a plurality of nodes and normally powered by an alternating power source out of the plurality of nodes at outlets, said electrical distribution system having at least one main breaker in an open configuration thereby electrically isolating at least a first outlet from the alternating power source;
wherein the first outlet of the plurality of outlets of the electrical distribution system downstream of the opened at least one main breaker and the second outlet of a backup power source are in electrical communication through a switch, said backup power source thereby providing alternating current to a selected portion of the electrical distribution system downstream of the at least one main breaker through the first and second outlets; whereby the backup power source provides the alternating current into the first outlet in an opposite direction of current flow than the first outlet has with the alternating power source normally powering the electrical distribution system when an appliance is connected to the first outlet.

12. The back up electrical distribution system of claim 11 further comprising a cord having at least two separated insulated conductors therein having a first end and an opposing second end.

13. The back up electrical distribution system of claim 11 further comprising voltage indicators indicating voltage towards at least one of the first and second outlets relative to the switch.

14. A temporary power supply comprising:
- an electrical distribution system having a plurality of nodes and normally receiving alternating current power from a normal source, said electrical distribution system having main breakers and a plurality of downstream breakers, at least one of said breakers having a downstream first outlet at a node supplied through the at least one of said main and downstream breakers in a selected portion of the electrical distribution system;
- a connector having a first end with a first male plug and a second end; and
- an alternative power supply providing power to the second end of the connector;
- wherein at least one of said plurality of downstream breakers and main breakers is opened thereby removing the normal source of alternating current power to the first outlet and the selected portion of the electrical distribution system, and said first end of said connector is connected by the first male plug to the first outlet thereby providing power from the alternative power supply to the selected portion of the electrical distribution system in an opposite direction of current flow than the first outlet has with the normal source when an appliance is connected to the first outlet.

15. The temporary power supply of claim 14 wherein the alternative power supply further comprises an inverter connected to at least one battery, said inverter converting direct current from the battery to alternating current sent through the connector into the first outlet.

16. The temporary power supply of claim 14 wherein the connector further comprises a second male plug at the second end and the alternative power supply has a second outlet connected thereto, and said second male plug is connected through the second outlet to provide power to the selected portion of the electrical distribution system.

17. The temporary power supply of claim 14 wherein the alternative power supply provides 120 volt alternating current power through the connector to the first outlet.

18. The temporary power supply of claim 14 further comprising a switch intermediate the first outlet and the alternative power supply.

19. The temporary power supply of claim 18 wherein the switch further comprises at least one breaker.

\* \* \* \* \*